United States Patent [19]

Jovick

[11] 3,969,002
[45] July 13, 1976

[54] MOUNTING PLATE FOR SECURING A BRAKE CONTROL VALVE TO A VEHICLE AXLE

[75] Inventor: Raymond John Jovick, Troy, Mich.

[73] Assignee: Rockwell International Corporation, Pittsburgh, Pa.

[22] Filed: Oct. 9, 1975

[21] Appl. No.: 621,221

[52] U.S. Cl. .............................. 303/21 F; 188/2 R; 301/124 R
[51] Int. Cl.² ........................................ B60T 8/04
[58] Field of Search ........... 188/2 R, 181 R, 181 A; 303/21 R, 21 F; 301/124 R; 180/75, 88; 251/144; 285/189, 193

[56] References Cited
UNITED STATES PATENTS

| | | |
|---|---|---|
| 1,520,705 | 12/1924 | Farmer ........................ 285/189 |
| 2,611,656 | 9/1952 | Vanderberg ................... 301/124 R |
| 2,854,997 | 10/1958 | Davis et al. .................. 251/144 |
| 3,743,362 | 7/1973 | Neisch ......................... 301/21 F |

FOREIGN PATENTS OR APPLICATIONS 495,146  8/1953  Canada .......................... 188/2 R Primary Examiner—Duane A. Reger
Assistant Examiner—Edward R. Kazenske

[57] ABSTRACT

An axle assembly including an anti-skid brake control valve mounted directly to the axle. The brake control or relay valve is mounted by means of a flange formed integrally with the valve body and is secured between the axle and a U-shaped mounting plate which reinforces the flange the resist road shock and axle vibration.

11 Claims, 4 Drawing Figures

U.S. Patent   July 13, 1976   3,969,002
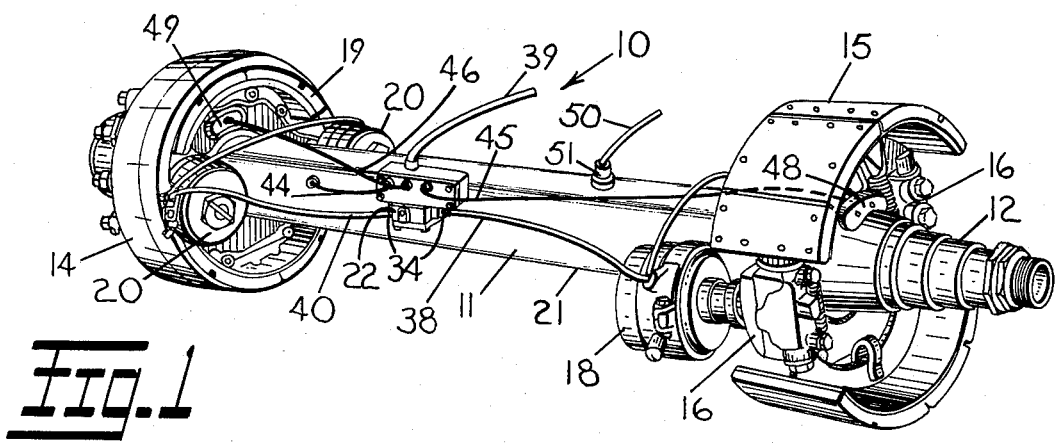
Fig.1
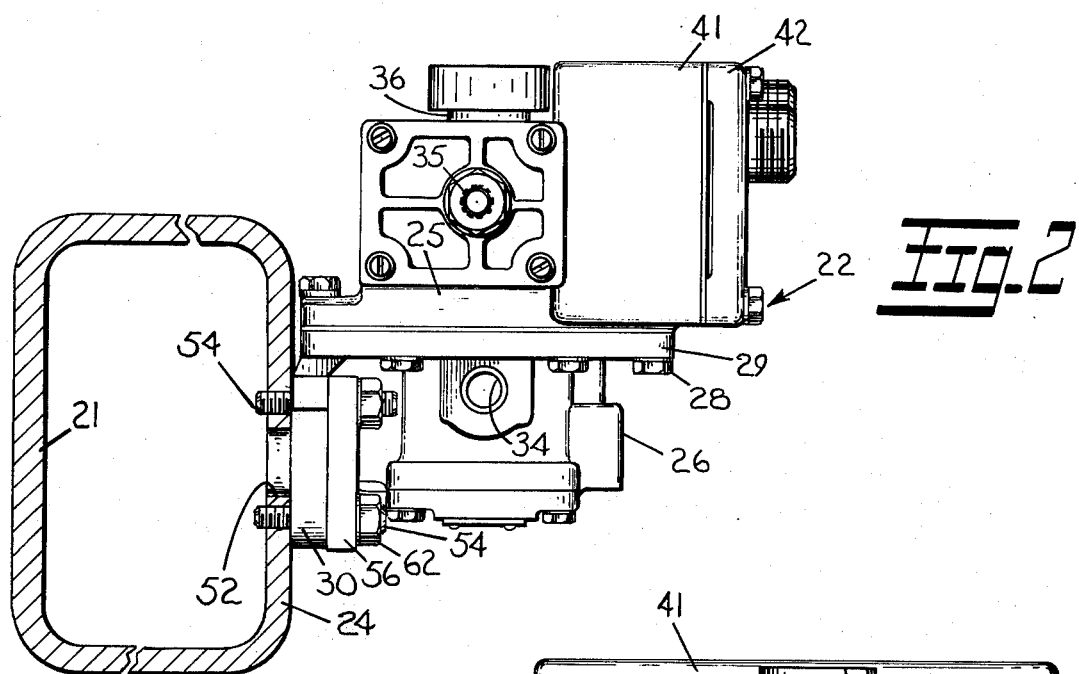
Fig.2
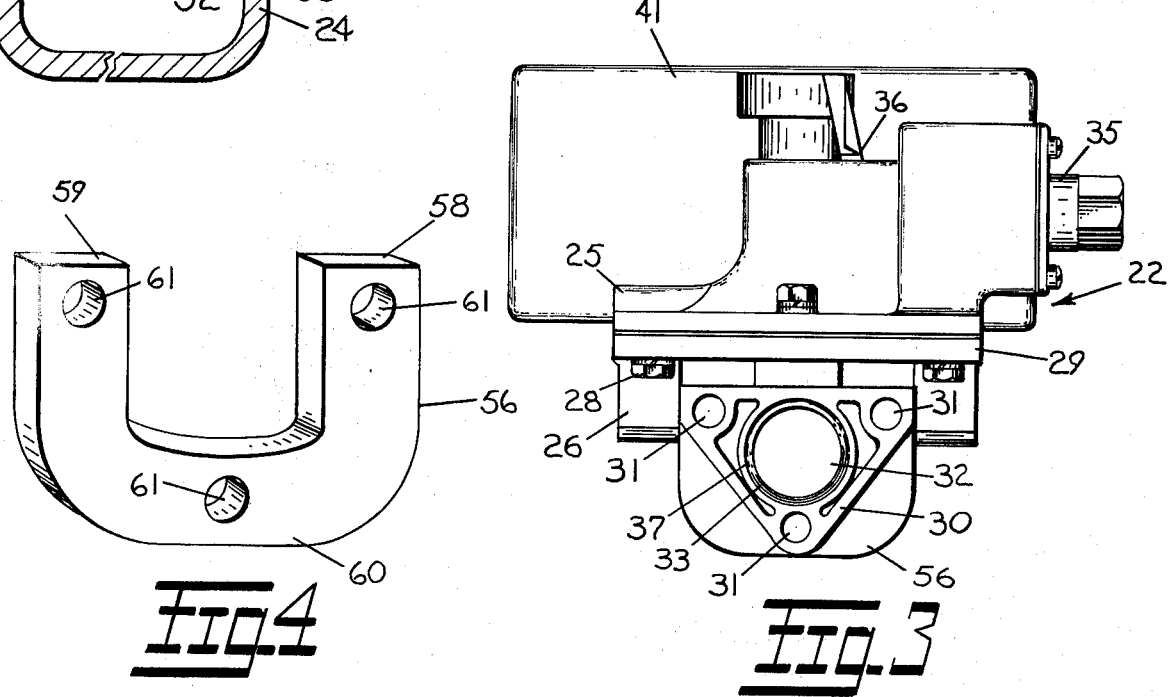
Fig.4
Fig.3

MOUNTING PLATE FOR SECURING A BRAKE CONTROL VALVE TO A VEHICLE AXLE

BACKGROUND OF THE INVENTION

This invention is directed to an axle assembly for a vehicle and, more specifically, to a trailer axle assembly including fluid powered brake mechanisms and a brake fluid relay valve mounted directly to the axle as a unitary assembly. The invention is particularly applicable to a trailer axle utilizing an anti-skid brake control system and provides a mounting plate for securing the brake control or relay valve directly to the axle.

Anti-skid brake control systems are now required on many commercial vehicles in the United States and are being adopted in other countries in the interest of traffic safety. One such system is disclosed in U.S. Pat. No. 3,790,227 which issued to L. C. Dozier on Feb. 5, 1974. A brake control valve which may be employed in such a system is disclosed in U.S. Pat. No. 3,740,105 which issued to A. B. Holmes on June 19, 1973.

Relay valves are used on trucks and trailers to supply air from a source such as an air reservoir to the vehicle brakes when the vehicle operator depresses the brake pedal. The relay or control valve in an anti-skid brake system operates in direct response to depression of the brake pedal, but also includes means for modulating the vehicle operator directed application of the brake fluid pressure in the event a wheel or wheel set decelerates at such a rate as to indicate an incipient skid condition. In such a system the angular velocity of the wheels at opposite ends of an axle is monitored by sensors which emit electrical signals indicative of the angular velocity of each wheel or wheel set and the signals are compared by electrical means. If an incipient skid condition is detected, the electrical means actuates an override device to modulate the vehicle operator directed application of brake fluid pressure until such time that the incipient skid condition no longer exists or the vehicle is brought to a stop. In the control valve disclosed in the aforesaid patent, the override device is a solenoid which operates a valve to modulate the application of control pressure to the relay valve. The solenoid is actuated by a electronic computer which is mounted in the relay or control valve body and electrically connected to the wheel speed sensors and the solenoid.

Relay or control valves are usually mounted directly to the chassis or frame of a truck or trailer where they are protected from road shock and axle vibration by the vehicle suspension. With the advent of safety regulations requiring anti-skid brake control systems for each axle of a vehicle, it has become apparent that certain advantages could be obtained from the use of a self-contained anti-wheel lock axle assembly requiring only an electrical connection to a power source and fluid pressure connections, usually air lines, to a source of fluid pressure and to the operator actuated brake pedal. Such an axle assembly and the advantages obtained thereby are disclosed in application Serial No. 550,096 filed on February 15, 1975, now U.S. Pat. No. 3,936,096 which is assigned to the assignee of the present invention.

Early attempts to mount a relay valve directly to an axle were unsuccessful due to failure of the mounting flange. The failures occurred adjacent one of the mounting studs and are believed to result primarily from the configuration of the valve body which due to road shock and axle vibration creates certain bending stresses in the mounting flange. The mounting flange is formed integrally with the valve body of a cast white metal or aluminum, both of which are light in weight and economical to manufacture, but they are also relatively brittle and subject to fracture under severe or repetitive bending stresses.

The control valve, in addition to the relay valve mechanism, also supports the override device and may also support the computer and related circuitry. When the latter components are supported in the valve body at a location remote from the mounting flange and the axle is subjected to road shock and vibration, the valve body develops a bending moment relative to the mounting flange which may cause the flange to fracture if stresses of a sufficient magnitude are developed. The potential fracture problem could be avoided by increasing the thickness of the mounting flange. However, this would require a flange having a thickness several times the flange thickness required for vibration free mounting on a vehicle frame or chassis. Such an approach would require either two different valve designs or result in considerable waste of material. The mounting flange style and hole pattern is standardized for replacement purposes. This object would also be defeated if the mounting flange were changed for axle mount units only. The use of a bracket in addition to the mounting flange to secure a portion of the valve body against vibration was also considered. This would require partial disassembly of the valve to secure it to the bracket and the valve would have to be proof tested after it is reassembled and secured to the bracket.

The present invention provides a simple, economical and effective means for mounting a relay valve or control valve directly to an axle and an axle assembly incorporating that means.

SUMMARY OF THE INVENTION

A vehicle axle assembly including an axle having ground engaging wheel mounting means and fluid powered brake mechanisms adjacent each end. A relay valve body having an integrally formed mounting flange and a plurality of holes extending through the flange is fixed to the axle by fastening means with the mounting flange secured between the axle and a mounting member. The mounting member of mounting plate is a reinforcing plate including a pair of legs joined at one end and spaced apart at their other ends. Three mounting holes are provided through the mounting plate. The holes are spaced for axial alignment with the holes through the mounting flange and are located one at each spaced apart end of the legs and one where the legs are joined together.

The present invention and the advantages offered thereby will become apparent from the following description of an embodiment of the invention and the accompanying drawings.

BRIEF DESCRIPTION OF THE DRAWINGS

In the drawings, wherein like reference numerals designate like parts throughout:

FIG. 1 is a perspective view of a vehicle axle assembly according to the present invention;

FIG. 2 is a side elevation, partly in section, showing the relay valve and axle assembly of FIG. 1;

FIG. 3 is a front elevation of the relay valve of FIGS. 1 and 2; and

FIG. 4 is a perspective view of the relay valve mounting member.

DESCRIPTION OF AN EMBODIMENT

With reference to the drawings, FIGS. 1 and 2 show a trailer axle assembly generally designated by the numeral 10. The axle assembly 10 includes an axle 11 including a wheel mounting spindle 12 at each end thereof. A wheel hub and brake drum 14 is shown mounted to a spindle at one end of the axle 11. Brake mechanisms 15 and 19 are mounted at each respective end of the axle 11. The brake mechanism 15 includes a pair of wedge type actuators 16 which are driven by a pair of air motors 18, only one of which is shown in FIG. 1. The brake mechanism 19 includes a pair of wedge type actuators within the brake drum 14 driven by a pair of air motors 20.

The interior or beam portion 21 of the axle 11 between the brake mechanisms 15 and 19 is formed as a hollow tubular member of rectangular cross section. A relay or brake control valve body 22 is mounted to a vertical wall 24, preferably the rearward facing wall, of the beam 21. The valve body 22 is comprised of an upper housing 25 and a lower housing 26. The housings 25 and 26 are secured together by bolts 28 passing through flange 29 of lower housing 26, the upper planar surface of which substantially bisects the valve body 22.

A mounting flange 30 is formed integrally with and at one side of the lower housing 26 of valve body 22. The mounting flange 30 is substantially triangular in shape and includes three mounting holes 31. The mounting flange 30 surrounds a port 32 opening into an inlet chamber in the lower housing 26. A pair of outlet ports 34 are provided, one at each side of the lower housing 26. A control or service pressure port 35 and an exhaust port 36 are provided to the upper housing 25.

The relay valve mechanism is provided internally of the valve body between the service pressure port 35 and the outlet ports 34 to control delivery of air pressure from the inlet chamber port 32 to the outlet ports 34 and then to the air motors 18 and 20 by the hose connections 38 and 40. Under normal operating conditions the relay valve mechanism is directly responsive to vehicle operator control pressure delivered to the control or service pressure port 35 by a conduit 39.

The upper housing 25 also mounts a solenoid actuated valve internally of the control or service pressure port 35 and includes a computer chamber 41 closed by a cover plate 42. A computer and related circuitry is mounted within the chamber 41. The computer is powered by means of an electrical lead 44 which may be connected to the vehicle stop light circuit. The computer is also electrically connected by leads 45 and 46 to wheel speed sensors 48 and 49 respectively mounted internally of the brake mechanisms 15 and 19 at each end of the axle 11. The sensors 48, 49 respond to rotors carried by the wheels or hubs at each end of the axle and emit electrical signals indicative of the angular velocity of each wheel. The computer monitors the signals emitted by the wheel speed sensors and, if the signals indicate a wheel is about to lock, the computer actuates the solenoid internally of port 35 to modulate the vehicle operator applied brake pressure until the vehicle is brought to a stop or the incipient skid condition no longer exists.

The trailer axle beam 21 is preferably sealed and the hollow interior serves as a reservoir of air pressure for delivery to the brake air motors 18 and 20. Air pressure is delivered to the hollow interior of axle beam 21 from a compressor by means of a hose 50 connected to a fitting 51 threaded through a wall of the axle beam. The air pressure is delivered to the relay or control valve body 22 through a beam outlet port 52 provided through the vertical wall 24 of axle beam 21.

Three studs 54 are threaded to and sealed against air leakage through the beam wall 24. The studs 54 are provided in a triangular pattern surrounding the beam outlet port 52. The studs 54 and port 52 are respectively spaced so as to be in axial alignment with the holes 31 and inlet port 32 of valve body 22.

A U-shaped mounting member or plate 56, as best shown in FIGS. 2 and 4, is employed to reinforce the mounting flange 30. The mounting plate is preferably formed from steel and may be about the same thickness as the valve body mounting flange 30. A 3/8 inch thick mounting plate formed from SAE Type 1010 steel has proven to be satisfactory. The plate 56 includes a pair of legs 58, 59 joined together at one end by a cross member 60. Three mounting holes 61 are provided to the mounting plate 56. The mounting holes extend through the thickness of the plate 56 and are located one at each spaced apart end of the legs 58, 59 and one through the cross member 60. The mounting holes 61 are spaced for axial alignment with the mounting holes 31 and the studs 54.

The valve body 22 is mounted to the axle wall 24 by aligning the mounting flange holes 31 with the studs 54 and moving the mounting flange 30 into surface-to-surface contact with the beam wall 24. When the axle beam is utilized as an air reservoir, it is preferable to use an annular sealing element 33 seated in a groove 37 to prevent leakage between the mounting flange 30 and the beam wall 24. The mounting plate 56 is then positioned with the legs 58, 59 on opposite sides of the inlet chamber of valve body 22 and the holes 61 aligned with the studs 54. The mounting plate 56 is then moved into contact with surface portions of the mounting flange 30 adjacent each of the holes 31. A washer and a nut 62 is then threaded to and tightened on each stud 54. The studs 54 and nuts 62 fix the valve body 22 to the axle beam 21 with the mounting flange secured between the mounting plate 56 and the beam wall 24.

This arrangement provides added strength to the assembly particularly the valve body mounting flange 30. The cross member 60 of mounting plate 56 abuts the flange surface adjacent the lower mounting hole 31 and effectively distributes bending loads developed in that portion of the flange by the valve body 22. The override solenoid, computer chamber 41, cover 42 and the computer and related circuitry are all mounted in the upper housing 25. As best shown by FIG. 2 these components are all spaced from the mounting flange 30 and located on the opposite side of the upper planar surface of flange 29. These components and the portions of upper housing 25 which enclose them present a substantial mass which is remote from the mounting flange 30 and acting as a cantilevered beam develops certain bending stresses in the mounting flange when the axle assembly is subjected to road shock and vibration. The steel mounting plate 56 prevents the flange 30 from moving relative to the mounting studs 54 and uniformly distributes the stresses induced when the cantilevered valve body 22 is subjected to road shock and axle vibration.

The flange reinforcing mounting plate thus provides a simple, economical and effective means for mounting a brake control valve body directly to an axle without changing any components of the standard valve body. Moreover, since the mounting plate is secured to the valve body only at the mounting flange there is no need to disassemble the control valve or retest the valve after it is reassembled.

Once the axle assembly is complete, it constitutes a selfcontained, anti-wheel lock axle assembly which can be readily mounted to a vehicle. All that is required is mechanical connection to the vehicle suspension, fluid connection of the conduits 39 and 50 and electrical connection of the lead 44.

The mounting plate may also be embodied in other specific forms without departing from the spirit or essential characteristics of the invention. The foregoing description is therefore to be considered as illustrative and not restrictive, the scope of the invention being defined by the appended claims and all changes which come within the meaning and range of equivalency of the claims as therefore intended to be embraced thereby.

I claim:

1. A vehicle axle assembly comprising an axle, means for rotatably mounting a ground engaging wheel at each end of said axle, a fluid powered brake mechanism mounted to said axle adjacent each end thereof, each brake mechanism being operative when actuated to restrain rotation of a wheel rotatably mounted at that end of the axle, a relay valve body having a mounting flange formed integral therewith, means providing a source of pressurized fluid to said valve body, conduits connecting said relay valve body to said brake mechanisms at each end of said axle, relay valve means within said body and operable when actuated to supply fluid pressure from said source to said brake mechanism, a plurality of holes extending through said mounting flange, a mounting plate contiguous with surface portions of said mounting flange adjacent each of said holes, a plurality of holes extending through said mounting plate, said holes through said mounting plate being axially aligned with said holes through said mounting flange, and fastening means extending through each of said axially aligned holes and fixing said valve body to said axle with said mounting flange secured between said mounting plate and said axle.

2. The axle assembly defined by claim 1 wherein said mounting flange is formed integrally with and at one side of said valve body, means for modulating the operation of said relay valve are mounted in said valve body, and said mounting flange and said modulating means are spaced from one another.

3. The axle assembly defined by claim 2 wherein said mounting flange and said modulating means are located on opposite sides of a plane bisecting said relay valve body.

4. The axle assembly defined by claim 1 wherein said valve body is comprised of an upper housing and a lower housing, said mounting flange is formed integral with one of said housings and surrounds an inlet port opening into an inlet chamber, and means for modulating the operaton of said relay valve are mounted in the other said housing.

5. The axle assembly defined by claim 4 wherein said axle assembly includes a wheel speed sensor mounted at each end of said axle and adapted to generate electrical signals indicative of the angular velocity of a wheel rotatably mounted at that end of the axle, and said means for modulating the operation of said relay valve is comprised of electrical means mounted in the other said housing and electrically connected to said wheel speed sensors.

6. The axle assembly defined by claim 4 wherein said axle is a hollow trailer axle and the interior of said axle provides said source of pressurized fluid.

7. The axle assembly defined by claim 6 wherein said pressurized fluid is delivered through an outlet port in a wall of said axle to said inlet port of said valve body and said assembly is sealed against leakage by a resilient annular sealing element seated in a groove concentric with said inlet port and compressed between said mounting flange and said axle by said fastening means.

8. The axle assembly defined by claim 1 wherein said relay valve body is a cast aluminum body and said mounting plate is a steel plate.

9. A unitary anti-wheel lock trailer axle assembly comprising a sealed hollow axle of rectangular cross section, means for supplying pressurized fluid to the interior of said axle, a fluid outlet port through a vertical wall of said axle, a wheel mounting spindle at each end of said axle, a fluid powered brake mechanism mounted to said axle adjacent each end thereof, a wheel speed sensor mounted at each end of said axle and adapted to generate electrical signals indicative of the angular velocity of a wheel rotatably mounted at that axle and a relay valve body comprised of an upper body housing and a lower body housing, conduits connecting said relay valve body to each of said brake mechanisms, relay valve modulating means mounted in one of said housings and electrically connected to said wheel speed sensors, a mounting flange formed integral with and at one side of the other said housing, said mounting flange surrounding an inlet port opening into an inlet chamber of said valve body, a mounting plate abutting a surface of said flange and fastening means extending through said mounting plate and said flange and fixing said valve body to said wall of said axle with said inlet port aligned with said outlet port and said mounting flange secured between said mounting plate and said wall of said axle.

10. An axle mounting plate for reinforcing a mounting flange formed integrally with and at one side of a brake relay valve body comprising a plate including a pair of legs joined at one end and spaced apart at their other ends, and three mounting holes extending through the thickness of said plate, said mounting holes being located one at each spaced apart end of said legs and one where said legs are joined together, each of said mounting holes through said plate being spaced for axial alignment with one of a group of mounting holes extending through said flange and arranged in a triangular pattern.

11. The mounting plate defined by claim 10 wherein said plate is a steel plate in the shape of a U.

* * * * *